UNITED STATES PATENT OFFICE.

JOHN H. COLLINS, OF ALBANY, NEW YORK.

IMPROVEMENT IN PROCESSES OF SEPARATING WOOL FROM RAGS OF COTTON AND WOOL.

Specification forming part of Letters Patent No. 131,504, dated September 24, 1872.

*To all whom it may concern:*

Be it known that I, JOHN H. COLLINS, of the city of Albany, county of Albany, State of New York, have invented an Improved Process of Separating Wool from Rags, of which the following is a specification:

The object of my invention is to recover the woolen or animal fiber from rags and produce an article suitable to be re-manufactured into merchantable fabric.

The following is a full and clear description of my process, which enables almost anybody, and especially those familiar with chemical processes, to extract and produce the wool or animal fiber in a clean state, the fibers being unimpaired by the process.

I mix in a suitable boiler sulphuric acid and water to show, by hydrometer for acid—Baumé's scale, temperature 62° Fahrenheit—from 6° to 12°, (medium 8°,) according to the quality of the rags. I then add salt until the same hydrometer shows 9° to 18°, (medium 12°,) according to the quality of the rags. Lastly, I add alum until the same hydrometer, immersed in the mixture, shows 10° to 19°, (medium 13°.) I then let this mixture, after being thoroughly united, boil by applying heat to the boiler, and place the rags in the same. I allow the rags to remain in the boiling mixture from four to twelve minutes, according to the quality of the rags. I then remove them and rinse them out in water, by which the cotton or vegetable fiber, destroyed by the action of the boiling mixture on the rags, will separate and leave the wool or animal fiber in an unimpaired state. The woolen product is then dried, picked, and carded, and is ready, as a merchantable article, to be used for the manufacturing of woolen fabrics, or woolen fabrics mixed with cotton.

I am fully aware that sulphuric acid and salt have been used before in a solution to separate wool from rags—in fact, there is a process known and practiced in Great Britain for more than thirty years back. The wool produced by this process is a very poor article, brittle, hard, and short. First, by the use of alum added to the sulphuric acid, water, and salt, did I succeed in producing an article of superior quality, soft, long, and uniform, the fibers of which are unimpaired, and can be used either alone or mixed with wool to produce superior woolen goods, or goods mixed with wool and cotton.

Having thus fully described my invention, I claim—

The process of recovering animal fiber from mixed rags, hereinbefore described.

JOHN H. COLLINS.

Witnesses:
FRANKLIN DARRITT,
RICHARD GERNER.